United States Patent [19]

Feins et al.

[11] 3,872,030

[45] Mar. 18, 1975

[54] MIX-MULLING PROCESS FOR IMPROVED HYDROTREATING CATALYST AND RESULTING PRODUCT

[75] Inventors: Irvin Ralph Feins, Westport; Robert Alan Bornfriend, Norwalk, both of Conn.

[73] Assignee: American Cyanamid Company, Stamford, Conn.

[22] Filed: Feb. 6, 1973

[21] Appl. No.: 330,167

[52] U.S. Cl. ............... 252/465, 252/466 J, 208/216
[51] Int. Cl. .......................... B01j 11/06, B01j 11/22
[58] Field of Search ..................... 252/465; 208/216

[56] References Cited
UNITED STATES PATENTS

| | | | |
|---|---|---|---|
| 2,393,288 | 1/1946 | Byrns | 252/465 X |
| 2,913,422 | 11/1959 | Reitmeier | 252/465 |
| 2,980,632 | 4/1961 | Malley et al. | 252/465 |
| 2,983,691 | 5/1961 | Richardson | 252/465 X |
| 3,051,662 | 8/1962 | Pitzer et al. | 252/430 |
| 3,267,025 | 8/1966 | Gring et al. | 208/216 X |
| 3,403,111 | 9/1968 | Colgan et al. | 252/465 |
| 3,471,399 | 10/1969 | O'Hara | 208/216 |
| 3,751,380 | 8/1973 | O'Hara | 252/439 |

FOREIGN PATENTS OR APPLICATIONS

| | | | |
|---|---|---|---|
| 1,220,105 | 1/1971 | United Kingdom | 252/465 |

*Primary Examiner*—Daniel E. Wyman
*Assistant Examiner*—W. J. Shine
*Attorney, Agent, or Firm*—William J. van Loo

[57] ABSTRACT

A mix-mulling process for a hydrodesulfurization catalyst composite is given wherein an alumina powder is mulled with promoter sources in conjunction with urea, is extruded, is dehydrated, and is activated to provide composites of improved activity.

10 Claims, No Drawings

MIX-MULLING PROCESS FOR IMPROVED HYDROTREATING CATALYST AND RESULTING PRODUCT

CROSS-REFERENCES TO RELATED APPLICATIONS

This application is related to application Ser. No. 330,166, Ser. No. 330,168, and Ser. No. 330,169, filed on even date herewith.

This invention relates to a mix-mulling process for preparing a hydrotreating catalyst and to the catalyst thus obtained. More particularly, it relates to a process for preparing a formed hydrodesulfurization catalyst wherein promoter sources and urea are added to a slurry of alumina, the resulting slurry is mix-mulled to extrusion consistency, then extruded and further processed to provide catalysts of improved activity.

In recent years, an increasing awareness of environmental pollution has become manifest, particularly with respect to air pollution. This awareness has, in turn, led to the recognition of pollution sources. A chief source of air pollution is the exhaust vapor emanating from internal combustion engines, i.e., automobiles. Much effort has been expended to control this pollutant, including legislation requiring reduced pollutant levels in exhaust vapor emanating from new cars. Although air pollution caused by cars has received considerable attention, air pollution by emissions from other sources has not been overlooked.

Significant contributors to air pollution are the emissions which arise in the combustion of heating oils used in furnaces. Such emissions contain oxides of sulfur which are toxic and reactive. Sulfur arises in these oils as a result of its presence in the crude oil source. The increasing shortages of energy supplies have created an acute shortage of heating oils. To relieve this shortage, resort must be had to inferior sources of heating oils which have increased sulfur contents. Such resort can give rise to increased pollution problems unless catalytic treatment of the heating oil sources can reduce the sulfur content effectively. Recently, legislation has been enacted to limit the content of sulfur in heating oils to 0.3 percent. In a recent critical shortage of heating oils, a major supplier requested that the limit as to sulfur content be raised to 2.8 percent so as to relieve the shortage. Since the sulfur present in heating oils is that which remains after catalytic treatment of the feed stocks from which heating oils are derived, a critical need for more active catalysts for treatment of feed stocks is apparent.

The feed stocks from which heating oils are derived are light catalytic cycle oils and light virgin gas oils, which are generally used in admixture. The terms used to describe the feed stocks refer more specifically to the manner by which they arise and indicate their boiling range. Typically, the blend of feed stocks has a boiling range of about 240°–730° F., a gravity of about 28–32 in accordance with the method of reporting specified by the American Petroleum Industry, a basic nitrogen content of about 30–50 parts per million, and a sulfur content of about 1.3–1.5 weight percent. However, the current trend to secondary feed stocks has apparently resulted in a considerable increase in sulfur content. Because of the high sulfur content of the feed stock blend and the adverse levels of pollutants generated by combustion thereof, it is subjected to catalytic hydrotreatment which reduces sulfur content as well as basic nitrogen content, so as to qualify the blend as an acceptable heating oil. The actual extent to which sulfur removal is effected will depend upon many factors, primarily the original sulfur content of the feed stock, the temperature at which treatment is effected, and the activity value of the catalyst employed in the hydrodesulfurization reaction. Although sulfur removal in the past was at the discretion of those converting feed stocks to heating oils, the recent legislation requires a high level of removal which is becoming increasing difficult to achieve. Although easing of this requirement is sought by suppliers of heating oils, the increasing presence of air pollutants in the atmosphere would indicate a contrary trend.

The most widely used catalysts in the hydrodesulfurization reaction as it applies to heating oils are composites comprising cobalt oxide, molybdenum oxide and alumina, wherein alumina is the support carrying the other agents as promoters. Typically, such catalysts are effective in removing form about 70 percent to 90 percent of the sulfur present in primary feed stocks. However, such removal can still leave sulfur levels above current limitations, especially when secondary feed stocks are considered. Although the more active of current catalyst materials can provide the required sulfur removal in primary feed stocks, the temperature required for effecting such removal is higher than is desirable. In addition, to achieve the necessary sulfur removal, peak activity must be maintainable over extended operating times and catalysts activity declines upon continued use, especially at high operating temperatures. The ever-decreasing availability of raw material sources and the ever-increasing shortage of heating oils have combined to make reliance upon secondary feed stocks essential and thus have complicated the problems of sulfur removal.

A number of conventional methods have been employed to prepare the catalyst composites useful in hydrotreating. A preferred procedure is to prepare a formed alumina support and thereafter impregnate the support with the desired levels of promoter sources. Upon activation of the impregnated support, the catalyst composite is obtained. The particular procedures followed and specific materials employed, however, can greatly influence catalytic activity of the composite obtained.

An alternative procedure is disclosed in British patent specification No. 1,220,105, published Jan. 21, 1971 in the name of Stamicarbon, N.V. The process disclosed prepares a supported metal-containing catalyst by precipitating on a support the catalytically-active material. The catalytic metal in the form of a soluble compound is prepared as a solution, said compound forming a precipitate on reaction with a hydroxyl ion. The support is added to the promoter solution to form a suspension. Hydroxyl ions by in situ generation are made available at a slow rate and under controlled agitation so that the precipitate is formed on the support and not in the body of the solution. Urea may be used as a source of hydroxyl ions by hydrolysis thereof.

In German Pat. No. 740,634, issued Oct. 26, 1943 to F. Stowenert, there is disclosed a process for preparing a catalyst by heating a solution of certain metal compounds that are precipitated in the presence of urea, the heating being carried out in the presence of a carrier to form an insoluble compound in or on said support.

In U.S. Pat. No. 3,637,529, issued Jan. 25, 1972 to Van Beek et al., there is disclosed a process for preparing a metallic catalytic agent by impregnating a carrier with an aqueous solution of a salt of the metallic catalytic agent and a source, upon heating in aqueous solution, of hydroxyl ions. This impregnated catalyst is then heated without substantial loss of water to precipitate the metallic catalytic agent on the carrier by the action of hydroxyl ions generated by such heating. Urea may be used as the source of hydroxyl ions by hydrolysis thereof upon heating.

The processes of the cited patents require complicated precipitation steps that are tedious to perform and difficult to control, have special requirements as to useful materials, and lead to destruction or loss of considerable product.

Thus, there continues to exist the need for improved processes for preparing catalyst composites that avoid the aforementioned deficiencies and provide hydrocracking catalysts of greatly improved activity in hydrodesulfurization.

It would also be highly desirable if a new process which can provide greatly improved catalytic activity could also reduce pollutant emissions normally associated with catalyst preparations. Pollutant emissions arise from use of nitric acid and nitrate salts used in catalyst preparations. These materials are present on the catalyst in the form in which it is activated. Upon activation of the catalyst copious emissions of oxides of nitrogen arise and can give rise to air pollution. To minimize air pollution possibilities, it is necessary to install and maintain costly and bulky scrubbers for treatment of the emissions arising from catalyst activation.

In accordance with the present invention, there is provided a process for preparing a hydrotreating catalyst composite which comprises: preparing an aqueous slurry of alumina powder; furnishing to said slurry sufficient of (a) a soluble cobalt source to provide from about 1 to 8 percent cobalt, (b) a soluble molybdenum source to provide from about 8 percent to 20 percent molybdenum, and (c) urea to provide at least about 0.5 mole per mole of cobalt present, said furnish providing in said slurry an aqueous solution of said furnish stable against precipitation; mix-mulling the resulting slurry so as to obtain an extrudable consistency; extruding the mix-mulled slurry; dehydrating the extrudate; and thereafter activating the composite formed to convert said metal sources to the corresponding oxides, said percentages being by weight, based on the weight of the activated support and expressed as their oxides.

The present invention provides a simplified process for forming and promoting a carrier powder to provide an improved hydrodesulfurization catalyst and offers many advantages. When sources of oxides of nitrogen are present in the catalyst being activated, the present process, by providing urea in the composite being activated converts such oxides to innocous emissions. Furnish requirements as to promoter sources are met within the range used in conventional mix-mulling techniques, thus minimizing solution volumes and added processing. The use of urea in conjunction with the promoter sources aids in stabilization with respect to precipitation of promotor sources. Such action by urea enables requirements for acid, if necessary as a solvent and/or solution stabilizer, to be reduced, thus minimizing or eliminating adverse effects on catalyst properties that can arise from acid residues persisting after activation. The catalyst composites obtained by the present process are uniformly colored in a royal blue shade and their appearance is strong evidence of a high degree of uniformity in promoter distribution. The combination of promoter sources and urea as employed in the present invention provides activated composites which exhibit sulfur removal activities that are much superior to those of prior art composites. Nitrogen removal activities are also much superior to those of prior art composites.

Certain of the results obtained by the present process are highly surprising and quite unexpected. Although urea was known to suppress oxides of nitrogen in unrelated area, the facts that urea should provide benefits in catalyst activity as well as aid in solution of promoter sources are highly surprising. The results as to catalytic activity are all the more surprising in view of the fact that no material changes in surface area and porosity from those of conventional catalysts are occasioned by use of urea in the present process. It is also surprising that urea provides greatly increased activity with cobalt-molybdenum promoter combinations in the present process and fails to provide any increased activity with nickel-molybdenum combinations under identical processing.

The present inventors are unaware of the exact mechanism by which urea effects the improved catalyst activity in the present process and do not wish to be bound by any theory. However, the inventors are of the opinion that urea, upon dehydration of the treated support, crystallizes upon the support and controls the manner in which the promoter sources form on the support. Urea is a well-known inclusion compound, hosting many guest compounds within its crystal structure. The reduced acid required occasioned by urea when such acid is normally required to solubilize and stabilize a solution of promoters also suggests a solubilizing role for urea, especially during later stages of dehydration of the treated extrudate. The uniform nature of the rich coloration of the activated composites is evidence of a highly uniform and intimate promoter distribution. Although it is not possible to determine the exact nature of the distinctive royal blue coloration, it nevertheless is a feature of catalysts provided by the process of the present invention.

In the present discussion, a carrier is a porous substrate or base upon which promoter materials are carried. Such substrates may be inactive or of limited activity in the catalytic reaction involved and the addition of promoter materials thereto imparts activity or improves activity with respect to the reaction. Promoter materials are substances which can be impregnated on the carrier and upon subsequent activation of the impregnated carrier will provide the active forms of the promoters, generally metals or metal oxides. A catalyst or catalyst material or composite consists of the carrier and the content of promoters.

Hydrotreating is a term used to denote that reduction in the presence of hydrogen is the catalytic process involved. Hydrodesulfurization is a term used to denote that sulfur is removed in a catalytic reaction with hydrogen. When sulfur removal is carried out on feed stocks for heating oils, it is effected by hydrodesulfurization. However, such feed stocks generally also contain nitrogen and it is generally removed coincidental to the sulfur removal. Thus, when both sulfur and nitrogen are removed, the process is properly termed hydrotreating. When only sulfur is removed, the process is properly called hydrodesulfurization. In the present discussion, emphasis is placed on hydrodesulfurization since that is the primary concern.

In carrying out the process of the present invention, the support employed is alumina. Conventional forms of alumina are useful, but a preferred form is precipitated alumina which has been spray-dried to a powder form. Typically such alumina may be prepared in accordance with the description appearing in U.S. Pat. No. 2,980,632, issued Apr. 18, 1961 to Malley et al. Since the alumina is to be obtained in a shaped form in accordance with the present invention, the starting alumina should be in essentially powder form. The alumina may contain small amounts of well-known stabilizers, such as up to about 10 weight percent silica.

The promoter materials that form the essential content of the catalyst composite are molybdenum and cobalt in the form of their oxides. Since the promoters are to be furnished so as to provide an aqueous solution in the alumina slurry, sources of appropriate solubility are required. In order to provide the necessary solubility for certain promoter sources at the level of usage contemplated, suitable acids may be necessary in appropriate amounts. Suitable acids, when necessary, include for example phosphoric, citric, tartaric, and gluconic acids. Solubilizing and stabilizing amounts should be employed. The presence of urea in the solution aids in solubilizing the promoters contemplated and reduces normal requirements for acids when used. Cobalt in the form of its nitrate salt is a convenient source of this promoter but other salts, such as the formate, acetate, hydroxide, and the like may be used. Molybdenum in the form of an ammonium molybdate, such as ammonium dimolybdate, ammonium heptamolybdate, and the like, is a convenient source of this promoter but other forms, such as molybdic oxide and phosphomolybdic acid may be used. A convenient procedure for preparing a promoter solution containing molybdic oxide is to dissolve the cobalt source, phosphoric acid, and urea in water and then add the molybdic acid which will dissolve more readily than by alternative procedures Urea usage may vary widely depending upon the nature of the promoter solution content. To obtain a desirable increase in activity of the catalyst composite, it is generally necessary to employ an amount of urea which corresponds to about 0.5 mole of urea per mole of cobalt present in the slurry solution. To some extent, greater urea usage increases activity until at about 2.5 moles of urea per mole of cobalt, maximum activity appear to be obtained. When sources of oxides of nitrogen are present, generally one mole of urea per 2 moles of oxide of nitrogen source expressed as a nitrate ion is sufficient to suppress the oxides of nitroges. The minimum usage of urea, however, is that based on cobalt as given, regardless of whether or not sources of oxides of nitrogen are present. The upper limit of urea usage is only dictated by practical considerations.

In carrying out the process of the present invention, the alumina powder is slurried in water using a conventional mix-muller. The slurry usually contains initially from about 40–80 percent of alumina, but the content is not particularly critical since adjustment of the content is contemplated as processing proceeds, since an extrudable consistency must be obtained. The particular content of alumina in the slurry to provide extrudable consistency can vary widely depending upon the particular form of alumina employed. Furthermore, the use of extrusion aids to aid in obtaining the desired consistency complicates specification of the necessary content of alumina. The present process, however, operates entirely within the conventional procedures for mix-mulling and the normal alumina slurry contents employed therein. While mix-mulling is being carried out the furnish of promoter sources is supplied and urea is provided. After a brief mixing, further modifications are then made as necessary to obtain the composition desired. If densification of the final composite is desired, nitric acid in suitable amounts is added. If desired, extrusion aids in appropriate amounts may also be added. A preferred type of extrusion aid is one based on polyacrylamide since it leaves no residue upon activation of the composite. As mix-mulling continues, adjustment of the consistency can be made by addition of water or alumina powder, as necessary. When mix-mulling is adequate and an extrudable consistency is obtained, the mixture is extruded. The extrudates formed are generally cut to the desired length in conjunction with extrusion. Dehydration of the extrudates and subsequent activation are carried out by conventional procedures.

The ingredients making up the furnish are, as indicated, a cobalt source, a molybdenum source, urea, and, optionally, an acid. These ingredients may be added to the slurry so as to dissolve therein. Alternatively, they may be added as separate or mixed solutions. Also, urea may be incorporated in the alumina in conjunction with alumina preparation so as to carry over therefrom into the present process. In such case, preparation of the slurry will extract urea from the alumina to furnish all or a part of the urea needed. Any additional urea needed may be added to the resulting slurry.

After the extrudates are formed by conventional extrusion techniques, the extrudates are subjected to dehydration to remove water therefrom. Dehydration does not need to be carried out as a separate step but may be accomplished during composite warm-up in conjunction with the activation step. When dehydration is contemplated as a separated step, however, it may be carried out at a temperature in the range of about 200°–500°F. for a time period suitable for the required water removal.

After any separate provision for dehydration contemplated or directly after extrusion, the extrudates are subjected to activation, which consists of heat treatment. Heat treatment is generally referred to as calcination and consists of exposing the extrudates to an elevated temperature for a specified time period, the combination of temperature and time being adequate to convert the metal sources to the corresponding oxides. Generally temperatures in the range of about 800° to 1300°F. are employed to complete conversion. The calcination is carried out in a manner such that the extrudate remains at the specified temperature for an hour or more, the time required to reach the temperature being additional. The specific heating schedule by which the extrudate reaches the final temperature may vary widely and may be influenced by the particular equipment employed. The activation may be by means of a calciner, muffle furnace, rotary kiln and similar devices which enable the desired temperature to be reached. In some instances, it may be desirable to carry out the heating schedule in a staged manner, i.e. taking a specified time to reach a selected first intermediate temperature, again taking a specified time from the first intermediate temperature to reach a second intermediate temperature and so on until the final temperature is reached and held for a specified time.

After activation is complete, there is obtained a deep royal blue catalyst composite highly active in sulfur and basic nitrogen removal when used in processing feed stocks for heating oils. Impregnation in the mix-muller overcomes problems of extrudate breakage associated with impregnation of pre-formed extrudates and subsequent activation thereof.

The particular level of promoter materials furnished on the alumina carrier will generally depend upon the specific hydrotreating reaction for which the catalyst composite is intended. For hydrodesulfurization reactions, the catalyst generally will contain from about 8 to 20 weight percent molybdenum and from about 1 to 8 weight percent cobalt based on the weight of the activated composite and expressed as the metal oxides.

The invention is more fully illustrated by the examples which follow wherein the parts and percentages are by weight unless otherwise specifically designated.

In order to provide a basis for comparision of activity of catalysts of the present invention with those of the prior art, a typical prior art catalyst was prepared and arbitrarily assigned an activity value of 100. The prior art catalyst, see Comparative Example below, contained 3 percent CoO and 15 percent $MoO_3$, by weight, based on the weight of the calcined extrudate. Examples of the present invention contain the same loadings. Performance is tested for sulfur removal under standard procedures. The heating oil tested had the following properties:

1.4 percent sulfur
35 ppm basic nitrogen
30.8 API gravity
240°F. low boiling point
726°F. high boiling point The tests were conducted at 650°F.

COMPARATIVE EXAMPLE

To 15 pounds of precipitated alumina in a mix-muller was added a solution consisting of 2.53 pounds ammonium heptamolybdate [$(NH_4)_6Mo_7O_{24} \cdot 4H_2O$], 2.01 pounds concentrated phosphoric acid, and 4.07 pounds cobalt nitrate hexahydrate in 13 pounds of water. The alumina and promoter solution were mixed briefly and then 2 pounds of 35 percent nitric acid were added. The mix was mulled for 30 minutes and 70 grams of polyacrylamide extrusion aid and 3 additional pounds of alumina were added. After an additional 60 minutes of mulling, the mixture was extruded through a die containing holes 0.070 inch in diameter and cut to various lengths. The extrudates were dried at 250°F. overnight and calcined for 1 hour at 1200°F.

The resulting catalyst had activities arbitrarly assigned values of 100. Thus, both the relative volume and weight sulfur activities were assigned values of 100.

EXAMPLE 1

The procedure of the above comparative example was repeated in every material detail except that the promoter solution contained in addition 372 grams of urea.

The activities of the catalyst obtained were found to be as follows:
$K_vSR=130$
$K_wSR=138$
relative to the catalyst of the comparative example.

EXAMPLE 2

The same procedure was followed as in the above comparative example except that the promoter solution contained in addition 1.64 pounds of urea.
The activities of the catalyst obtained were found to be as follows:
$K_vSR=154$
$K_wSR=160$
relative to the catalyst of the comparative example.

EXAMPLE 3

The procedure of Example 1 was followed in every material detail except that the nitric acid was eliminated from the promoter solution and replaced by an equal weight of water.
The catalyst obtained had the following activities:
$K_vSR=149$
$K_wSR=179$

EXAMPLE 4

The procedure of Example 2 was followed in every material detail except that the nitric acid was eliminated from the promoter solution and replaced by an equal weight of water.
The catalyst obtained had the following activities relative to that of the comparative example:
$K_vSR=143$
$K_wSR=149$

We claim:

1. A process for preparing a hydrotreating catalyst composite which comprises: preparing an aqueous slurry of alumina powder; furnishing to said slurry sufficient of (a) a soluble cobalt compound thermally decomposable to the metal oxide to provide from about 1 to 8 percent cobalt, (b) sufficient of a soluble molybdenum compound thermally decomposable to the metal oxide to provide from about 8 to 20 percent molybdenum, and (c) sufficient urea to provide at least 0.5 mole of urea per mole of cobalt present, said furnish providing in said slurry an aqueous solution of said furnish stable against precipitation; mix-mulling the resulting slurry so as to obtain an extrudable consistency; extruding the mixed-mulled slurry; dehydrating the extrudate; and thereafter activating the composite formed to convert said metal compounds to the corresponding oxides, said percentages being by weight, based on the weight of the activated support and expressed as the oxides.

2. The process of claim 1 wherein the cobalt compound and the molybdenum compound are furnished as a single aqueous solution of both ingredients.

3. The process of claim 1 wherein the cobalt compound, molybdenum compound, and urea are furnished as a single aqueous solution of the three ingredients.

4. The process of claim 1 wherein the cobalt compound, molybdenum compound, and urea are furnished as separate aqueous solutions.

5. The process of claim 1 wherein nitric acid is also furnished in said slurry in an amount sufficient to densify the catalyst composite.

6. The process of claim 1 wherein a polyacrylamide extrusion aid is added to said slurry prior to extrusion.

7. The process of claim 1 wherein the cobalt compound is cobalt nitrate.

8. The process of claim 1 wherein the molybdenum compound is an ammonium molybdate.

9. The process of claim 8 wherein said ammonium molybdate is ammonium heptamolybdate.

10. A catalyst composite obtained by the process of claim 1.

* * * * *